(12) United States Patent
Tench et al.

(10) Patent No.: US 11,870,205 B2
(45) Date of Patent: Jan. 9, 2024

(54) EFFICIENT IN-BAND PUMPING OF HOLMIUM-DOPED OPTICAL FIBER AMPLIFIERS

(71) Applicant: Cybel, LLC., Bethlehem, PA (US)

(72) Inventors: Robert E. Tench, Allentown, PA (US); Jean-Marc Delavaux, Pittstown, NJ (US)

(73) Assignee: Cybel, LLC., Bethlehem, PA (US)

( * ) Notice: Subject to any disclaimer, the term of this patent is extended or adjusted under 35 U.S.C. 154(b) by 549 days.

(21) Appl. No.: 16/929,072

(22) Filed: Jul. 14, 2020

(65) Prior Publication Data

US 2022/0021173 A1 Jan. 20, 2022

(51) Int. Cl.
*H01S 3/067* (2006.01)
*H01S 3/094* (2006.01)
*H01S 3/16* (2006.01)

(52) U.S. Cl.
CPC ...... *H01S 3/06716* (2013.01); *H01S 3/06712* (2013.01); *H01S 3/06733* (2013.01); *H01S 3/06754* (2013.01); *H01S 3/094011* (2013.01); *H01S 3/094042* (2013.01); *H01S 3/094076* (2013.01); *H01S 3/161* (2013.01); *H01S 3/1616* (2013.01)

(58) Field of Classification Search
CPC ............. H01S 3/161; H01S 3/06716; H01S 3/094038; H01S 3/094011; H01S 3/094007
See application file for complete search history.

(56) References Cited

U.S. PATENT DOCUMENTS

| | | | |
|---|---|---|---|
| 6,137,813 A | 10/2000 | Ionov et al. | |
| 6,353,497 B1 | 3/2002 | Zhang et al. | |
| 6,476,960 B1 | 11/2002 | Traynor et al. | |
| 6,583,927 B2 | 6/2003 | Choi et al. | |
| 6,853,480 B2 | 2/2005 | Choi et al. | |
| 7,106,762 B1 | 9/2006 | Jiang et al. | |

(Continued)

OTHER PUBLICATIONS

Tench et al. "Shared Pump Two-Stage Polarization-Maintaining Holmium-Doped Fiber Amplifier", IEEE Photonics Technology Letters, vol. 31, issue 5, pp. 357-360, published Jan. 29, 2019). (Year: 2019).*

(Continued)

*Primary Examiner* — Eric L Bolda
(74) *Attorney, Agent, or Firm* — Wendy W. Koba

(57) ABSTRACT

A fiber-based optical amplifier for operation at an eye-safe input signal wavelength $\lambda_S$ within the 2 μm region is formed to include a section of Holmium (Ho)-doped optical gain fiber. The pump source for the fiber amplifier is particularly configured to provide pump light at a wavelength where the absorption coefficient of the Ho-doped optical gain fiber exceeds its gain coefficient (referred to as an "absorption-dominant pump wavelength"), and is typically within the range of 1800-1900 nm. The selection of an absorption-dominant pump wavelength limits the spontaneous emission of the pump from affecting the amount of gain achieved at the higher wavelength end of the operating region. The amount of crosstalk between the signal wavelength and pump wavelength is also reduced (in comparison to using the conventional 1940 nm pump wavelength).

17 Claims, 12 Drawing Sheets

(56) References Cited

U.S. PATENT DOCUMENTS

| | | | |
|---|---|---|---|
| 7,113,328 B2 | 9/2006 | Gomes et al. | |
| 7,170,909 B2 | 1/2007 | Budni et al. | |
| 7,286,587 B2 | 10/2007 | Budni | |
| 7,298,547 B1* | 11/2007 | Jiang | H01S 3/06795 |
| | | | 359/341.1 |
| 7,502,391 B2 | 3/2009 | Varnham et al. | |
| 7,940,453 B2 | 5/2011 | Murison et al. | |
| 10,211,591 B2 | 2/2019 | Kanskar | |
| 10,348,051 B1* | 7/2019 | Shah | G01S 17/34 |
| 2007/0002905 A1* | 1/2007 | Budni | H01S 3/06716 |
| | | | 372/71 |
| 2015/0002923 A1* | 1/2015 | Onaka | H01S 3/1603 |
| | | | 359/341.5 |
| 2018/0159296 A1* | 6/2018 | Johnson | H01S 3/06758 |
| 2018/0261969 A1* | 9/2018 | Augst | H01S 3/10023 |
| 2021/0226403 A1* | 7/2021 | Delavaux | H01S 3/06758 |
| 2021/0328400 A1* | 10/2021 | Delavaux | H01S 3/06754 |
| 2021/0367392 A1* | 11/2021 | Delavaux | H01S 3/1608 |

OTHER PUBLICATIONS

Li, Z., et al., "Diode-Pumped Wideband Thulium-Doped Fiber Amplifiers for Optical Communications in the 1800-2050 nm Window", Optics Express, Nov. 4, 2013/vol. 21, No. 22, pp. 26450-26455.

Liu, Fang, et al., "Tandem-Pumped, Tunable Thulium-Doped Fiber Laser in 2.1 μm Wavelength Region", Optics Express, Mar. 18, 2019, vol. 27, No. 6, pp. 8283-8290.

Wang, Junjia, et al., "Broadband Silica-Based Thulium Doped Fiber Amplifier Employing Multi-Wavelength Pumping", Optics Express, Oct. 3, 2016, vol. 24, No. 20, pp. 23001-23008.

* cited by examiner

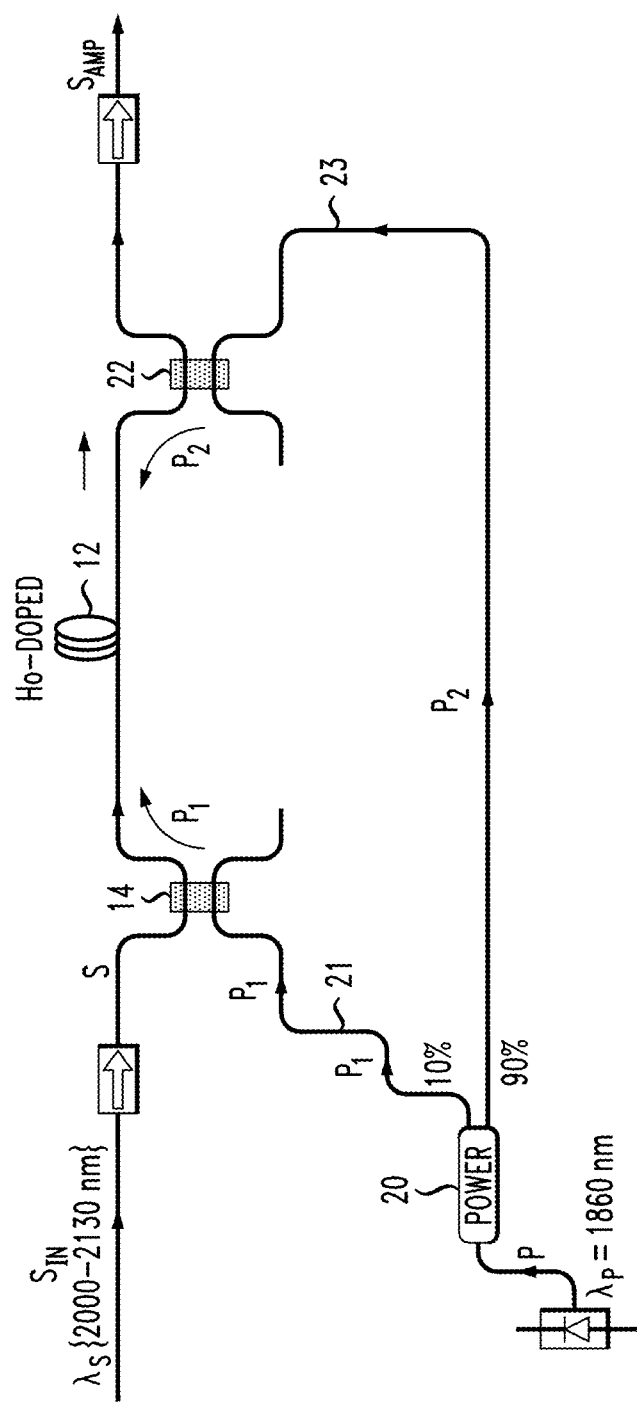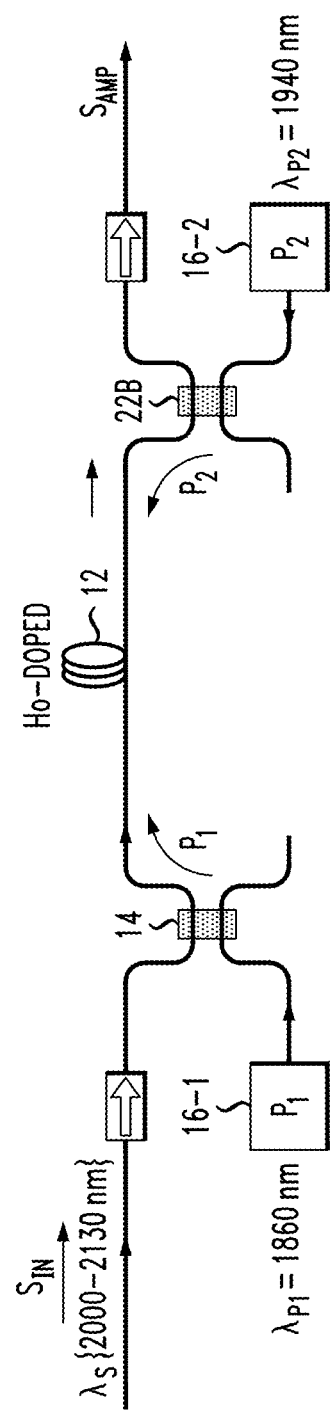

30

30A

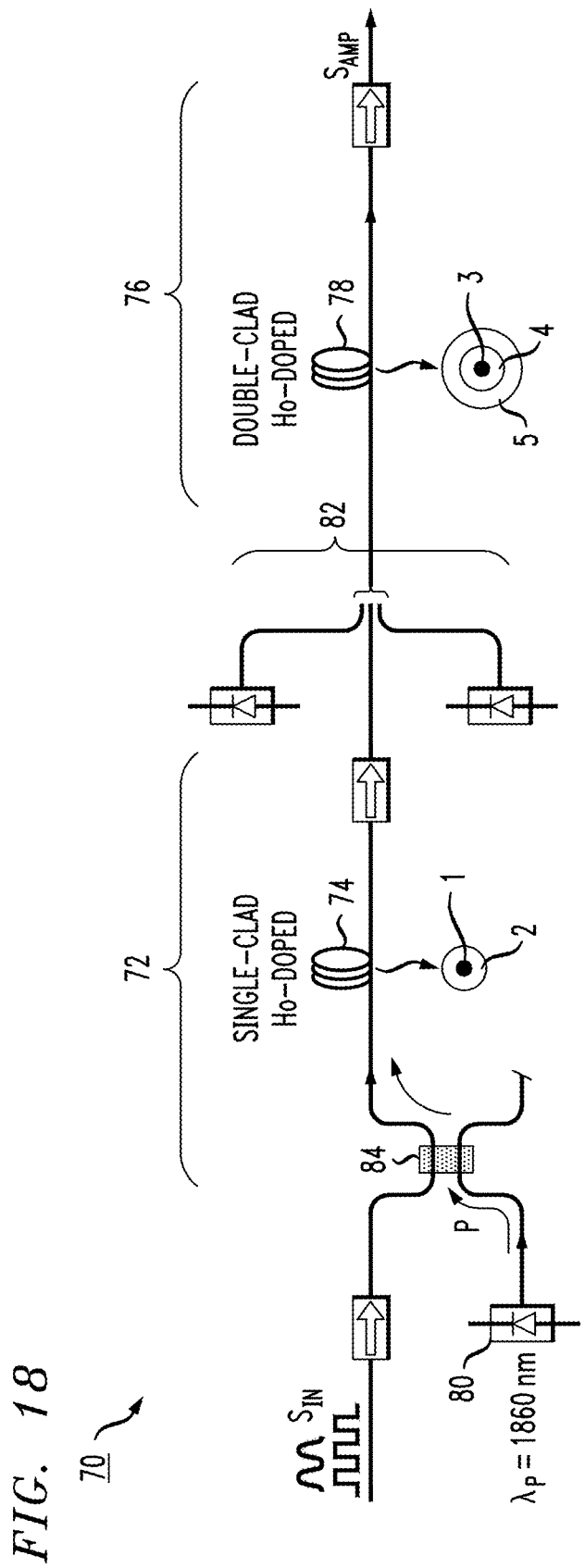

EFFICIENT IN-BAND PUMPING OF HOLMIUM-DOPED OPTICAL FIBER AMPLIFIERS

TECHNICAL FIELD

The present invention relates to Holmium-doped (Ho-doped) optical fiber amplifiers suitable for use in the visible region of about 2 μm and, more particularly, to the utilization of specific pump wavelengths based upon the gain and absorption characteristics of the Ho-doped gain fiber.

BACKGROUND OF THE INVENTION

There is a continuing need to develop optical systems that are capable of operating in the eye-safe 2 μm wavelength region. Applications such as LIDAR, atmospheric sensing (e.g., $CO_2$), WDM communication systems, and the like, are among those that will need to rely on high performance optical devices that operate within this 2 μm wavelength region.

Investigation of appropriate solutions has led to the development of optical fiber amplifiers based upon the use of Holmium-doped (Ho-doped) gain fibers. Previous work has described developments based upon the use of single-clad Ho-doped fibers, which allow for relatively compact amplifier modules. One continuing area of research relates to optimizing the characteristics of the pump source (in terms of wavelength and power, for example) that provide the best results for a given application.

SUMMARY OF THE INVENTION

The present invention relates to a Ho-doped fiber amplifier and, more particularly, to the utilization of specific pump wavelengths based upon the gain and absorption characteristics of the Ho-doped gain fiber.

In accordance with the principles of the present invention, it is proposed to utilize pump wavelengths selected from the wavelength region where the effects of absorption dominate gain (i.e., where the absorption coefficient for the selected Ho-doped gain fiber exceeds the related gain coefficient). By virtue of selecting a pump wavelength in this absorption-dominant range, the likelihood of amplified spontaneous emission occurring within the higher-end of the broadband input wavelength range (that is, wavelengths of about 2000 nm and higher) is significantly reduced. As a result, the ability to create a population inversion and generate higher levels of gain and output power (with respect to the prior art) is significantly improved. Indeed, the utilization of pump wavelengths from an absorption-dominant wavelength region (which may extend, for example, from 1800-1900 nm), has been found to also result in higher levels of saturated output power, greater small-signal gain, and improved optical-to-optical efficiency, as will be discussed in detail below.

Inasmuch as the absorption of the pump energy is less dependent on wavelength than gain, the use of a pump wavelength from within the absorption-dominant region means that the amplifier will exhibit a greater degree of stability in the presence of pump wavelength fluctuations (which may result from environmental conditions, age of the pump source, pump drive current, and the like). As a result, wavelength stabilization components are not required to maintain acceptable pump performance.

Ho-doped fiber amplifiers formed in accordance with the principles of the present invention may utilize single-clad Ho-doped fibers, or double-clad Ho-doped fibers, and may also be based upon the use of Tm—Ho co-doped fibers. Multi-stage arrangements of the fiber amplifier of the present invention may be configured to utilize specific characteristics for each amplifier stage (e.g., a single-clad Ho-doped gain fiber for the preamplifier stage, and a double-clad Ho-doped gain fiber for a power amplifier stage), with various arrangements of co-propagating and counter-propagating pump beams used in accordance with the performance requirements for a specific application.

An exemplary embodiment of the present invention takes the form of an optical amplifier for operation at an eye-safe input signal wavelength $\lambda_S$ within the 2 μm region, and is formed to include a section of Holmium (Ho)-doped optical gain fiber which exhibits a gain coefficient G and an absorption coefficient α that both vary as a function of an applied pump wavelength ($\lambda_P$) and a pump source used to generate optical gain within a propagating optical input signal. The pump source is configured to provide pump light at a pump wavelength $\lambda_P$ within an absorption-dominant wavelength region where $\alpha(\lambda_P) > G(\lambda_P)$, typically within the wavelength region of about 1800 nm to 1900 nm.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 7 is a block diagram of an alternative embodiment of the present invention, in this case using both a co-propagating pump beam and a counter-propagating pump beam;

FIG. 8 illustrates an alternative configuration for the embodiment of FIG. 7, in this case using separate pump sources to supply the co-propagating pump beam and the counter-propagating pump beam;

FIG. 18 is a block diagram of another multi-stage amplifier formed in accordance with the present invention, where in this case a preamplifier stage is based upon a single-clad Ho-doped optical gain fiber and a power amplifier stage is based upon a double-clad Ho-doped optical gain fiber, both stages pumped by a beam operating at an absorption-dominant wavelength;

DETAILED DESCRIPTION

Figure 1:
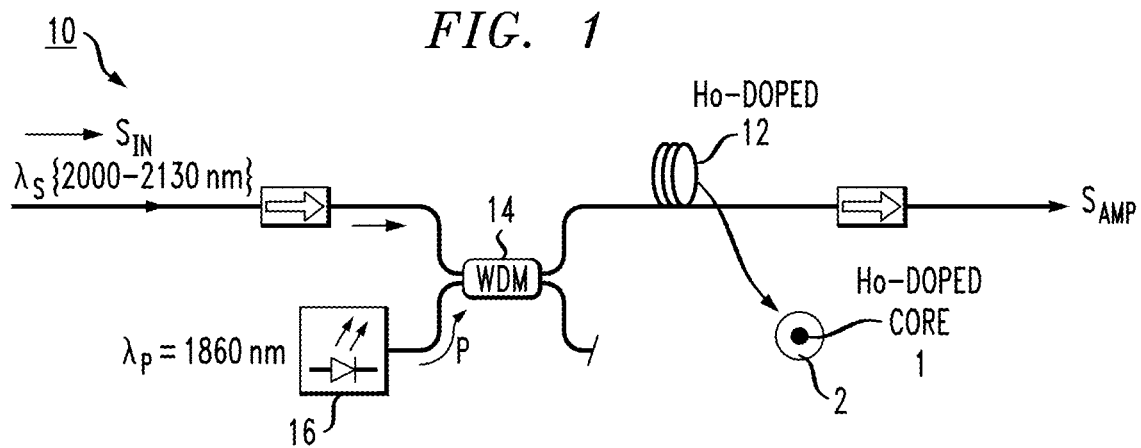
FIG. 1 is a block diagram of an exemplary Ho-doped optical amplifier (HDFA) formed in accordance with the present invention to utilize a pump source operating at an absorption-dominant wavelength.

FIG. 1 contains a block diagram of an exemplary Ho-doped fiber amplifier (HDFA) 10 formed in accordance with the principles of the present invention. In this particular embodiment, HDFA 10 is based upon the use of a section of single-clad optical fiber 12 that has been fabricated to include a Ho-doped core region 1, surrounded by a silica-based cladding layer 2 (shown in the inset of FIG. 1). As mentioned above, a doped fiber amplifier based upon the use of a double-clad Ho-doped optical fiber may also benefit from the use of a pump wavelength selected from the absorption-dominant wavelength. Specific embodiments of the present invention that include double-clad Ho-doped gain fibers will be discussed below in association with FIGS.

Returning to the discussion of FIG. 1, HDFA 10 is shown as providing amplification for an input optical signal (denoted $S_{IN}$) operating at a wavelength $\lambda_S$ within a portion of the eye-safe band. For the sake of explanation, input signal $S_{IN}$ is defined as being a single frequency input, operating at an input wavelength $\lambda_S$ within this band. Input optical signal $S_{IN}$ is shown in FIG. 1 as passing through an input isolator before being coupled to a signal port of a wavelength division multiplexer (WDM) 14. Pump light P from an associated pump source 16 operating at a specific absorption-dominant pump wavelength $\lambda_P$ (as discussed in detail below) is coupled into a pump port of WDM 14, with the output from WDM 14 being a combination of both the input signal $S_{IN}$ and pump light P. The combination of $S_{IN}$ and P is thereafter applied as an input to single-clad Ho-doped gain fiber 12. In particular, WDM 14 is configured to couple these inputs into Ho-doped core region 1 of single-clad gain fiber 12.

Ho-doped gain fiber 12 may comprise either standard single mode optical fiber (i.e., non-polarization-maintaining), or fiber of polarization-maintaining (PM) construction. For applications that operate with a single polarization signal, PM fiber is preferably used in order to maintain the orientation of the propagating signal along a designated axis without the need for additional polarization controlling elements. While PM fiber is preferred for use along the signal path from $S_{IN}$ to $S_{AMP}$, pump source 16 and the pump path(s) between source 16 and the associated gain fiber utilized for polarization-sensitive applications may comprise standard single mode fiber.

The arrangement as shown in FIG. 1 is referred to as a "co-propagating" amplifier configuration since both the input signal $S_{IN}$ and pump light P propagate in the same direction through single-clad Ho-doped gain fiber 12. Amplification of input signal $S_{IN}$ within gain fiber 12 is achieved via a process well-known in the art where presence of pump light P at an appropriate wavelength $\lambda_P$ (as will be discussed in detail below) functions to excite the Ho ions present in core region 1 of gain fiber 12, resulting in amplification of input optical signal $S_{IN}$. The amplified output signal $S_{AMP}$ from single-clad Ho-doped gain fiber 12 is shown in FIG. 1 as passing through an output isolator before exiting HDFA 10 as amplified output signal $S_{AMP}$.

It is to be understood that even though these isolators have not been particularly described or enumerated, these devices are typically included in all fiber amplifier arrangements and used to prevent the propagation of reflections (include pump beams, as discussed below) within doped fiber amplifier, where the reflections are known to increase the noise level within the amplifier and diminish the available output power. Similar isolators are illustrated in the various other embodiments as will be discussed in detail below, and perform a similar well-known function.

Figure 2:
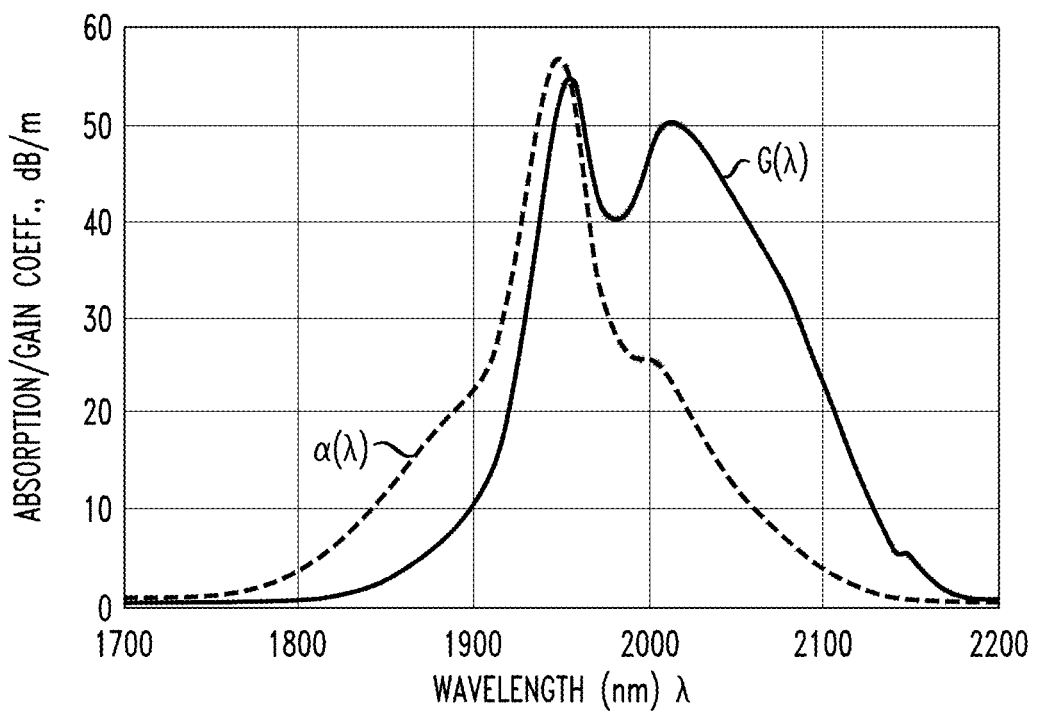
FIG. 2 contains plots of the absorption coefficient $\alpha(\lambda)$ and gain coefficient $G(\lambda)$ as a function of pump wavelength for a section of Ho-doped optical gain fiber.

The performance of a doped fiber amplifier can be evaluated by analyzing the absorption and gain curves associated with the transfer of energy from the rare-earth ions (here $Ho^+$ ions) to the propagating optical input signal as a function of pump wavelength. In general, the absorption coefficient $\alpha(\lambda)$ is related to the ability of the Ho-doped fiber to accept energy from the pump beam, while the gain coefficient $G(\lambda)$ is related to the increase in the signal level of the propagating input signal for the pump beam wavelength. FIG. 2 contains plots of both the absorption coefficient and gain coefficient for single-clad Ho-doped gain fiber 12. As shown, a maximum absorption coefficient of about 57 dB/m is associated with a pump wavelength of about 1945 nm. To date, Ho-doped fiber amplifier configurations have typically been based upon the use of a pump input operating at a wavelength of 1940 nm, which is near a maximum value for both gain and absorption.

A careful analysis of additional properties of the gain curve, however, have led to the conclusion that pumping at the nominal pump wavelength of 1940 nm may lead to a reduction in the gain available for higher wavelengths in the signal band of interest. In particular, the unavoidable presence of stimulated emission at the pump wavelength takes away from the population inversion for the higher wavelength values of interest here, namely, the 2000-2100 nm signal band. Thus, a decision regarding pump wavelength selection without taking into consideration the effects of stimulated emission may lead to sub-optimal performance of an Ho-doped fiber amplifier, in accordance with the principles of the present invention.

Figure 3:
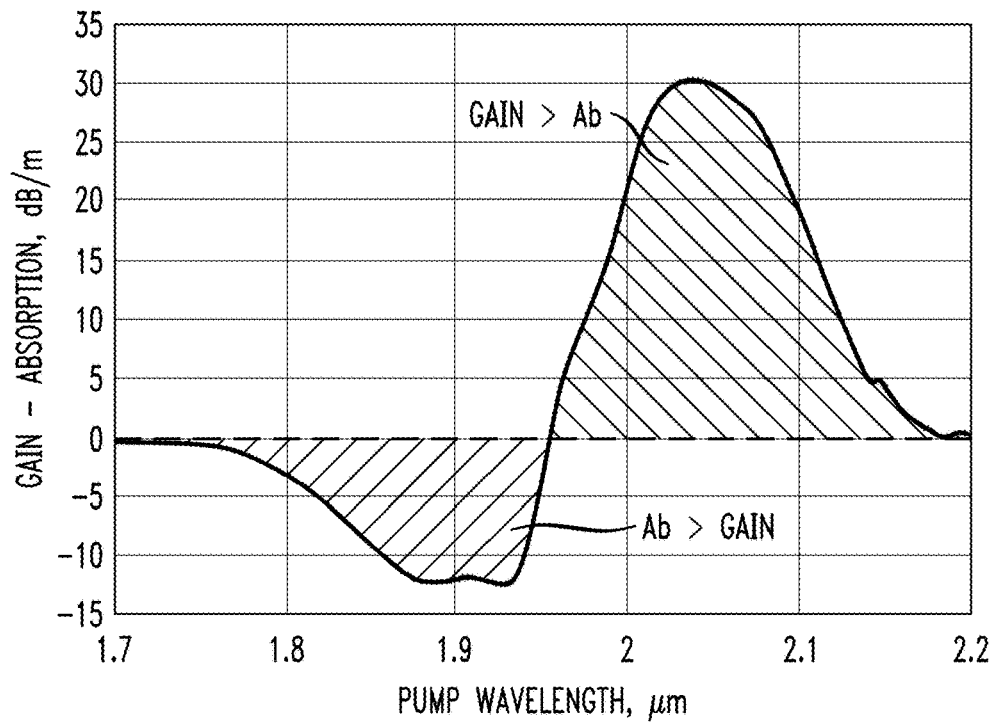
FIG. 3 is a plot of the difference between the curves for $\alpha(\lambda)$ and $G(\lambda)$ of FIG. 2, illustrating a wavelength region where $\alpha(\lambda) > G(\lambda)$.

FIG. 3 is a plot of the difference between gain and absorption coefficients for curves as shown in FIG. 2, which further illustrates the impact of stimulated emission on the operable bandwidth of an Ho-doped optical fiber amplifier. It is clearly shown in FIG. 3 that absorption dominates the amplification process for pump wavelengths in the range of about 1800-1950 nm, whereas gain dominates the amplification process for wavelengths in the higher wavelength range of 1950 nm-2150 nm. Based on the presumptions regarding the presence or absence of stimulated emission at the pump wavelength, it follows that for Ho-doped fibers, in-band pumping at wavelengths of 1800-1900 nm (that is, the absorption-dominant wavelengths) may be a preferred option when wanting to achieve acceptable levels of gain for higher wavelength input signals. By using these lower wavelength values for pumping (where the gain is not maximized), an appreciable supply of pump energy remains available to generate the necessary population inversion at the higher wavelengths.

Moreover, as mentioned above, the selection of a pump wavelength from the absorption-dominant region has been found to increase the stability of the amplifier performance in the presence of changing conditions that could cause fluctuations in the pump wavelength (e.g., ambient temperature changes, change in pump driving current, aging of the pump source, other environmental changes, etc.). Additionally, the relatively large wavelength difference between the pump wavelength and the signal wavelength (as compared to using the conventional 1940 nm pump) eases restrictions of the fabrication of amplifier components, since the possibility of crosstalk between these two wavelengths is minimal.

Figure 4:
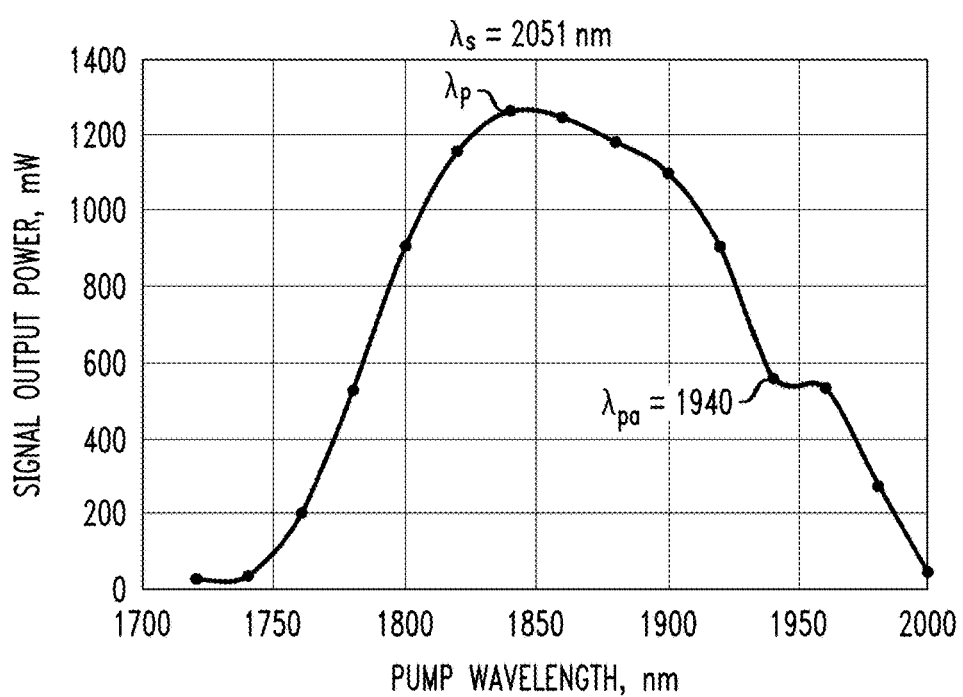
FIG. 4 is a plot of saturated output power as a function of pump wavelength for the HDFA configuration of FIG. 1.

FIG. 4 is a plot of saturated output power as a function of pump wavelength for HDFA 10 as shown in FIG. 1, which clearly demonstrates the relationship between pump wavelength and output power. The data of FIG. 4 is associated with an input signal $S_{IN}$ operating at a relatively "high" signal wavelength $\lambda_S$ of 2051 nm, with the saturated output power of amplified output signal $S_{AMP}$ measured for various pump wavelengths ranging from 1720 nm to 2000 nm. It is to be understood that pump source 16 operated at a consistent power (here, 2470 mW) as the different values of saturated output power were measured.

Referring now to the plot of FIG. 4 in particular, it is shown that the signal output power exhibits a relatively high output power (e.g., greater than about 900 mW) over the pump wavelength range of about 1790-1930 nm, and indeed yields an output power in excess of about 1000 mW over a fairly broad wavelength range from about 1820 nm to about 1880 nm. In contrast, the output power associated with the conventional 1940 nm pump wavelength is shown in this same plot as exhibiting a value of about 563 mW, considerably reduced from the about 900 mW levels for the absorption-dominant pump wavelength values. In particular, the numerical advantage of pumping at, for example, 1860 nm relative to 1940 nm is shown to yield an improvement by a factor of 2.26, realized as a 3.5 dB increase in power. These results confirm the principles of the present invention that the utilization of absorption-dominant pump wavelengths significantly reduce the presence of stimulated emission and allow for acceptable levels of population inversion to be generated at higher wavelengths.

Various embodiments of the present invention that will be discussed in detail below will describe the use of a preferred absorption-dominant pump wavelength of 1860 nm (i.e., $\lambda_P=1860$ nm). It is to be understood that this specific value is only one of many possible wavelengths that may be used from this absorption-dominant wavelength region. For most Ho-doped optical fibers, this absorption-dominant wavelength region extends from about 1800 nm to 1900 nm, with perhaps a preferred range of 1820 nm to 1880 nm. In various ones of the embodiments discussed below, the selected pump wavelength of 1860 nm is considered to be exemplary only.

Figure 5:
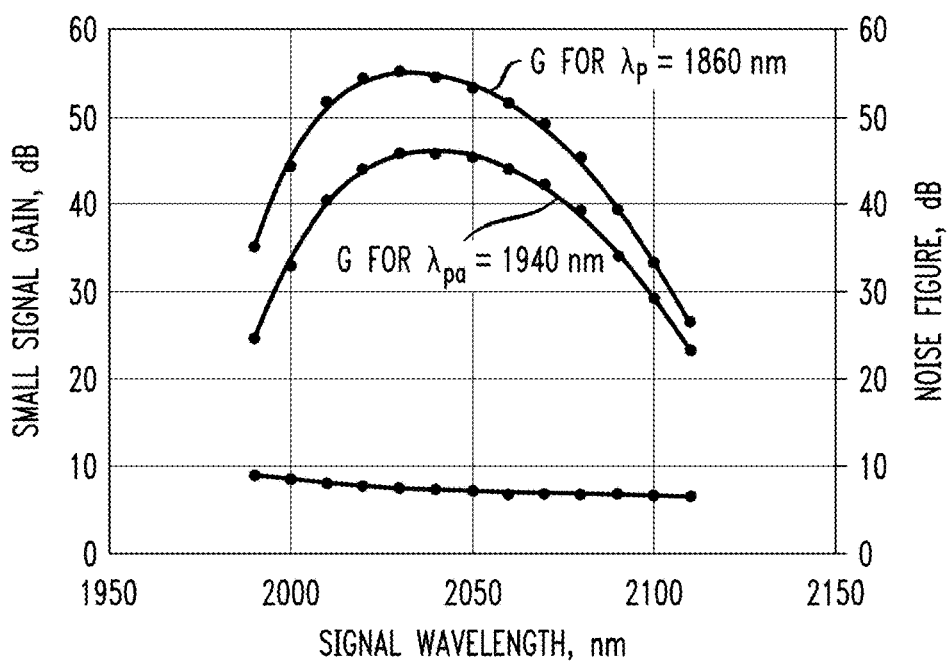
FIG. 5 contains plots of simulated vales of gain and noise figure as a function of input signal wavelength for both a prior art HDFA and the HDFA of FIG. 1.

FIG. 5 contains plots of simulated values of G and noise figure (NF) as a function of input signal wavelength $\lambda_s$ (at an input power of about −31.6 dBm) for both the conventional "prior art" 1940 nm pump wavelength (hereinafter denoted as $\lambda_{pa}$) and a preferred absorption-dominant pump wavelength $\lambda_P$ of 1860 nm associated with the teachings of the present invention. The advantage of pumping at 1860 nm is clearly shown by comparing the gain plots for these two pump wavelength values, where the peak gain at the absorption-dominant wavelength of $\lambda_P=1860$ nm is about 54 dB, in comparison to a peak gain of 47 dB for conventional pumping with $\lambda_{pa}=1940$ nm. The simulated noise figures for the two pump wavelengths track one another very closely, with maximum noise figures of 10 dB at a signal wavelength $\lambda_s=1990$ nm and minimum noise figures of 6.8 dB at $\lambda_s=2110$ nm.

Figure 6:
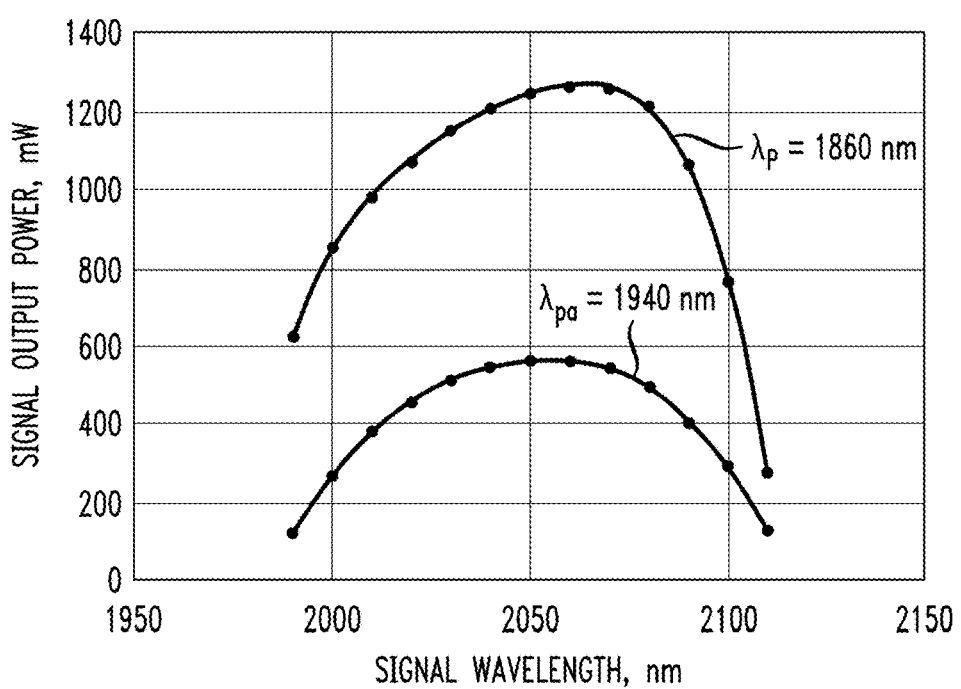
FIG. 6 is a plot of output power as a function of input signal wavelength, illustrating the spectral band over which HDFA may operate.

FIG. 6 plots output power as a function of input signal wavelength ($\lambda_S$) over an exemplary eye-safe wavelength band of $\lambda_s$ of 1990 to 2110 nm. Here again, the effectiveness of pumping at $\lambda_P=1860$ nm relative to the prior art ($\lambda_{pa}=1940$ nm) is quite evident, with an increase in peak power between the two pump wavelengths of about 3.5 dB.

As will be discussed in detail below, there are various configurations of an HDFA that may be implemented by using an absorption-dominant pump wavelength in accordance with the principles of the present invention. For example, FIG. 7 illustrates a co- and counter-pumped single stage HDFA 10A where pump source 16 (operating at $\lambda_P=1860$ nm) is divided within a power splitter 20 and used to pump single-clad Ho-doped gain fiber 12 in both the forward and backward directions. An additional WDM 22 is shown as disposed beyond the output of single-clad Ho-doped gain fiber 12 and used in this embodiment to inject a second pump beam that will propagate through gain fiber 12 in the counter-propagating direction (with respect to the propagation direction of input signal $S_{IN}$ through gain fiber 12). In some cases, an optical circulator may be used instead of a WDM to introduce a counter-propagating pump beam to an amplifier. Arrangements of this type are considered to fall within the scope of the present invention, and are described in detail in our co-pending patent application Ser. No. 16/849,182, filed Apr. 15, 2020.

In the particular configuration of FIG. 7, power splitter 20 is designed to direct about 10% of the available pump power along a first pump path 21, which is coupled to the pump input of WDM 14 (resulting in about 10% of the available pump power used in a co-propagating pump beam). The remaining 90% of the pump power is delivered by power splitter 20 along a second pump path 23, which is coupled to the pump input of WDM 22 (resulting in about 90% of the available pump power used in a counter-propagating pump beam). Here, the propagating input signal $S_{IN}$ experiences increased gain provided by both pump beams and results in forming an amplified output signal $S_{AMP}$ that is greater in terms of both gain and saturated output power than the arrangement of HDFA 10 of FIG. 1.

The 10/90 split depicted for power splitter 20 is considered to be exemplary only and various other ratios better-suited for specific applications are considered to fall within the scope of the present invention. That said, the use of a larger pump power for the counter-propagating pump is considered to be preferred in terms of power conversion efficiency. Clearly, this embodiment of FIG. 7 shows that Ho-doped gain fiber 12 may co- and counter-pumped by a single pump source 16, yielding improved performance over cases where only co- or counter-pumping is used.

An alternative co- and counter-pumped HDFA 10B formed in accordance with the principles of the present invention is shown in FIG. 8. Similar to the first embodiment discussed above, a first pump source 16-1 operating at $\lambda_P$=1860 is used as a co-propagating pump input and is combined with input signal $S_{IN}$ within WDM 14, and thereafter introduced into Ho-doped gain fiber 12. In this particular embodiment, a second pump source 16-2, operating at the conventional wavelength $\lambda_{pa}$=1940 nm, is provided as an input to a second WDM 22B so as to be introduced in a counter-propagating direction into Ho-doped gain fiber 12. In this embodiment, therefore, the separate pump wavelengths can be tailored to optimize the overall performance of the amplifier in the generation of the amplified output signal $S_{AMP}$. Here, while a 1940 nm pump wavelength is known to generate stimulated emission at high wavelengths, it is used in this embodiment to supplement the presence of the co-propagating absorption-dominant pump wavelength to impart a higher level of gain to the output.

While the above-described embodiments are associated with a Ho-doped gain fiber (which may be single-clad or double-clad fiber), the principles of the present invention related to selection of a pump wavelength from an absorption-dominant wavelength range are equally applicable to fiber amplifiers that utilize a co-doped gain fiber, such as a Thulium-Holmium (Tm—Ho) co-doped gain fiber. When using a co-doped fiber, the ability to utilize separate pump sources allows for pump beams operating at specific wavelengths best-suited for each dopant to be employed.

Figure 9:
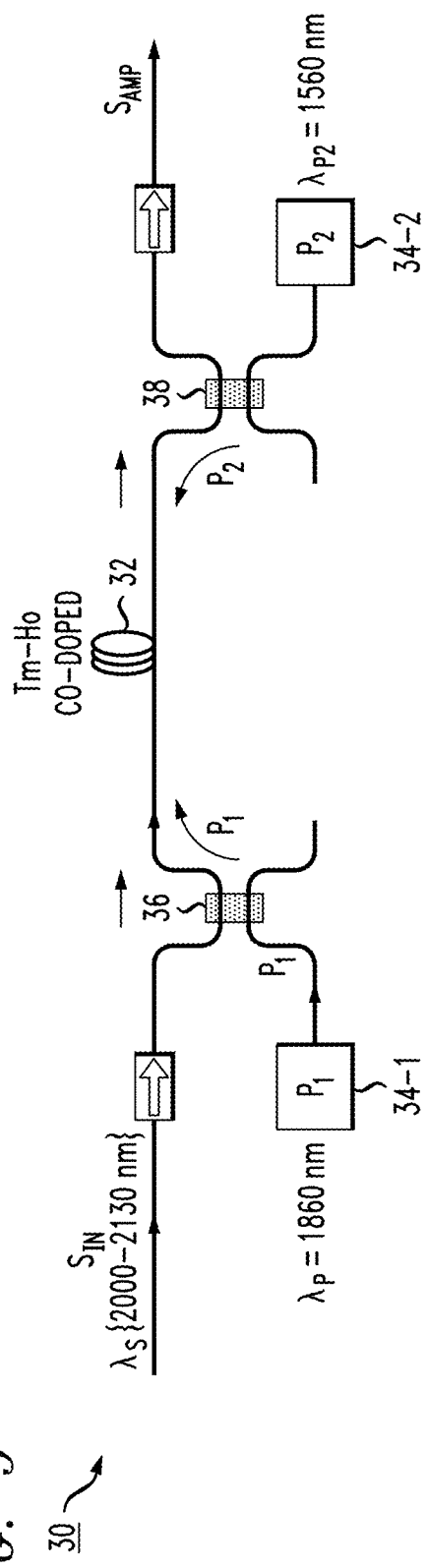
FIG. 9 is a block diagram of yet another embodiment of the present invention, in this case based upon the use of a Thulium-Holmium (Tm—Ho) co-doped optical gain fiber.

In particular, FIG. 9 illustrates an exemplary doped fiber amplifier 30 that is based upon the use of a section of Tm—Ho co-doped gain fiber 32. By virtue of using a pair of separate pump sources 34-1, 34-2 (similar to the configuration of FIG. 8), this embodiment of the present invention allows for a first pump source 34-1 to provide a first pump beam $P_1$ operating at an absorption-dominant pump wavelength as discussed above for use with Ho-doped gain fiber 12 (i.e., in the range from about 1800-1880, and here selected an exemplary value of $\lambda_{P1}$=1860 nm). A second pump source 34-2 is used in this embodiment to provide a second pump beam $P_2$, operating in this case at a second pump wavelength $\lambda_{P2}$=1560 nm, this second pump wavelength associated with creating gain in the presence of Tm ions within the gain fiber.

A first WDM 36 is shown in FIG. 9 as used to multiplex together input signal $S_{IN}$ and first pump beam $P_1$, thereafter applying the combination as a co-propagating input to Tm—Ho co-doped gain fiber 32. The presence of first pump beam P1 in combination with the Ho ions in Tm—Ho co-doped fiber 32 thus imparts gain to propagating signal $S_{IN}$. Second pump beam $P_2$ is shown as provided as an input to a second WDM 38, which is disposed to direct second pump beam $P_2$ in a counter-propagating direction through co-doped gain fiber 32. The wavelength of second pump beam $P_2$ is selected to interact with the Tm ions present in co-doped gain fiber 32, imparting an additional level of gain to the propagating signal $S_{IN}$. Using co-doped gain fiber 32 to generate amplified output signal $S_{AMP}$ thus yields the advantage of both Ho- and Tm-based amplification at their respective signal wavelength bands and removes the need for separate lengths of Ho-doped gain fiber and Tm-doped gain fiber, simplifying the architecture of a doped fiber amplifier formed in accordance with the principles of the present invention.

Figure 10:
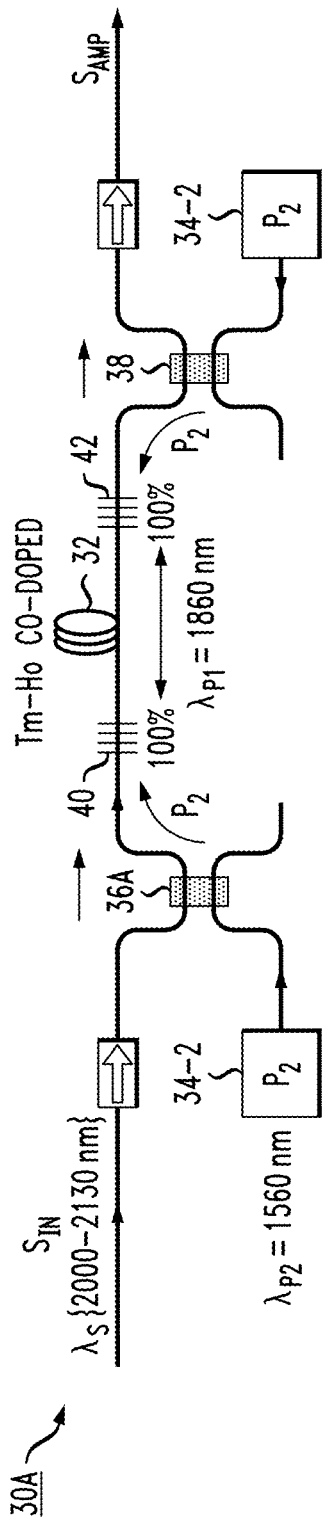
FIG. 10 illustrates an alternative configuration for the embodiment of FIG. 9, using fiber Bragg gratings (FBGs) to create a fiber laser operating at the desired absorption-dominant pump wavelength along the section of co-doped optical gain fiber.

FIG. 10 illustrates an alternative configuration of the Tm—Ho co-doped fiber amplifier of FIG. 9, where in this case doped fiber amplifier 30A requires the use of only a single pump source (denoted as 34-2) operating at the second pump wavelength $\lambda_{P2}$=1560 nm as discussed above. A pump beam operating at this second pump wavelength $\lambda_{P2}$ is used as both a co-propagating pump beam and a counter-propagating pump beam in this arrangement, applied as an input to both a first WDM 36A and second WDM 38 (the latter WDM essentially the same component as that used in doped fiber amplifier 30 shown in FIG. 9). In this arrangement, therefore, the Tm dopant present within Tm—Ho co-doped gain fiber 32 is able to interact with both a co-propagating pump beam and a counter-propagating pump beam.

Also shown in doped fiber amplifier 30A is a pair of fiber Bragg gratings (FBGs) configured to support the generation of the absorption-dominant pump wavelength preferred for exciting the Ho dopants in gain fiber 32. Referring to FIG. 10, a first FBG 40 and a second FBG 42 are disposed at the input and output of co-doped gain fiber 32, respectively. FBGs 40 and 42 are configured to have 100% reflectivity at the desired pump wavelength (here, $\lambda_P$=1860 nm), and 0% reflectivity at all other wavelengths. Using the Tm doping in gain fiber 32, and with the provided co- and counter-pumping of gain fiber 32 at $\lambda_{P2}$=1560 nm, FBGs 40, 42 and the Tm doping in gain fiber 32 form a fiber laser at 1860 nm, which then pumps the Ho doping in gain fiber 32 and provides amplification in the Ho wavelength signal band. This pumping configuration removes the need for separate external pumps at 1860 nm for the amplifier and simplifies the amplifier design considerably relative to earlier architectures.

Figure 11:
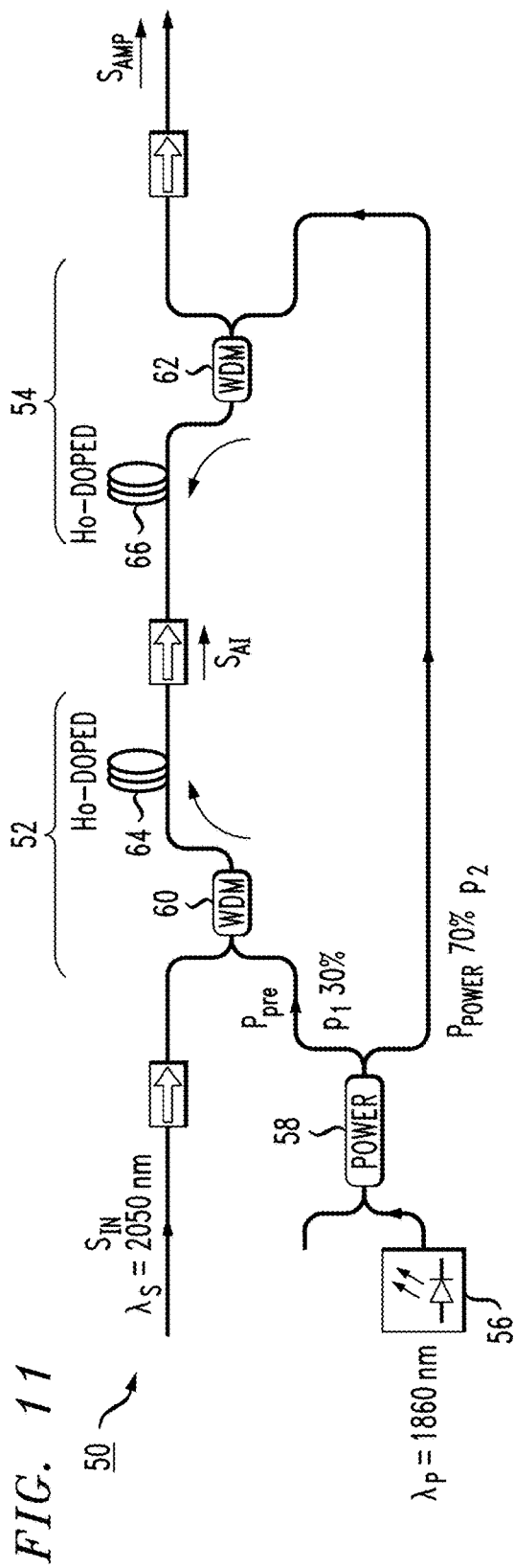
FIG. 11 is a block diagram of a multi-stage HDFA formed in accordance with the present invention, in this case a two-stage arrangement where each stage uses a pump operating at an absorption-dominant wavelength.

FIG. 11 illustrates yet another embodiment of the present invention that utilizes absorption-dominant pump wavelengths, where in particular FIG. 11 depicts a two-stage Ho-doped fiber amplifier 50. In this particular configuration, two-stage HDFA 50 comprises a preamplifier stage 52 followed by a power amplifier stage 54, with each amplifier stage taking the form of a single-clad Ho-doped fiber amplifier as discussed above. A single pump source 56 is used in this particular arrangement to supply pump beams P at $\lambda_P$=1860 nm to both preamplifier stage 52 and power amplifier stage 54 (alternatively, it is to be understood that each stage may include its own pump source, operating at a power appropriate for that stage).

A power splitter 58 is positioned at the output of pump source 56 and is used in this particular embodiment to control the ratio of pump powers supplied to amplifier stages 52 and 54. Here, power splitter 58 provides a first pump beam output $P_{pre}$ output at a first output power $p_1$, which is thereafter provided as a pump input to a WDM 60 at the input to preamplifier stage 52. A second pump beam output $P_{power}$ at a second output power $p_2$ is provided as the second output from power splitter 58 and is then applied as an input to a WDM 62 associated with power amplifier stage 54.

Referring now in particular to preamplifier stage 52, incoming optical signal $S_{IN}$ is shown as also applied as an input to WDM 60, which then directs both the input signal and pump into a first section of single-clad Ho-doped gain fiber 64 within preamplifier stage 52. Similar to the configurations described above, the presence of pump light at 1860 nm results in transferring energy to propagating signal $S_{IN}$, generating an inter-stage amplified output signal $S_{A1}$. Amplified output $S_{A1}$ is typically passed through an inter-stage isolator and then provided as an input (amplified) signal to power amplifier stage 54. As shown in FIG. 11, amplified signal $S_{A1}$ is coupled into a second section of single-clad Ho-doped gain fiber 66 within power amplifier stage 54. Here, the larger power fraction of the pump beam ($P_{power}$) is delivered by WDM 62 into the output of Ho-doped gain fiber 66 so as to counter-propagate with respect to the propagation direction of amplified input signal $S_{A1}$. The presence of the large-power pump beam generates a relatively large amount of gain, generating amplified output signal $S_{AMP}$.

Figure 12:
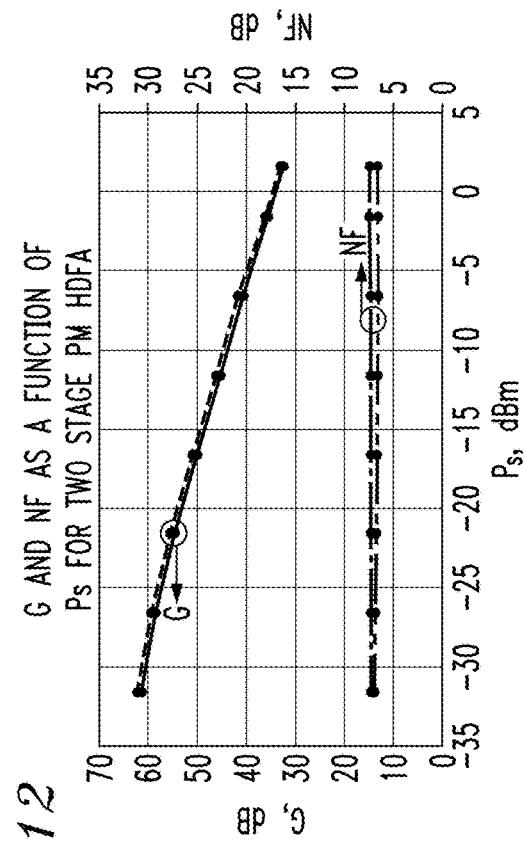
FIG. 12 contains plots of the gain and noise figure for the two-stage HDFA of FIG. 11.

FIG. 12 contains plots of the gain and noise figure of two-stage amplifier 50 of FIG. 11. In particular, the values shown in FIG. 12 were generated as a function of signal input power ($S_{IN,pow}$) for a signal wavelength $\lambda_S$ of 2050 nm (clearly, a wavelength within the higher end of the wavelength range of interest). The gain plot of FIG. 12 shows that the maximum small signal gain for $\lambda_P$=1860 nm is a relatively high value of 62.3 dB and the noise figure is essentially constant at 6.7 dB. These high gains and low noise figures indicate that the amplifier will perform quite well as a preamplifier and also as an amplifier for pulse input signals with low duty cycles and correspondingly low average optical powers.

Figure 13:
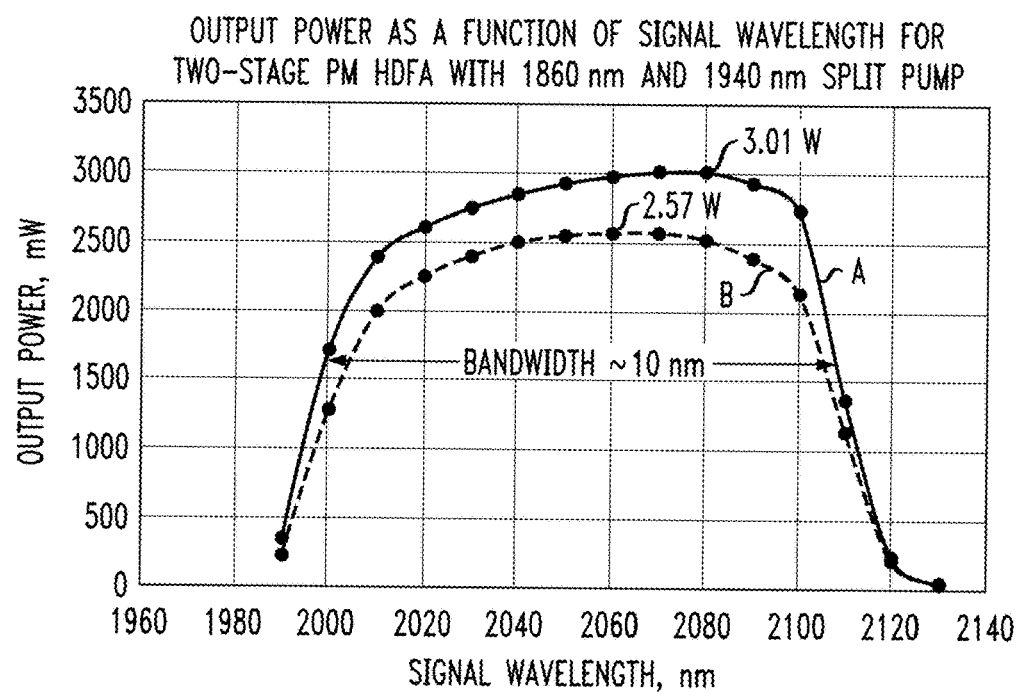
FIG. 13 is a graph comparing the spectral bandwidth of the two-stage HDFA of FIG. 11 to a prior art two-stage HDFA, illustrating the improvement in both peak output power and operating bandwidth.

FIG. 13 is a graph comparing the spectral bandwidth of the inventive two-stage amplifier of FIG. 11 (identified as "plot A") to the bandwidth of a prior art two-stage HDFA using a conventional pump beam operating at 1940 nm (identified as "plot B"). In particular, both plots A and B depict the saturated output power from a two-stage Ho-doped fiber amplifier as a function of signal wavelength $\lambda_S$ ranging from 1980 nm to 2120 nm. It is clearly shown in plot A that the peak output power from the inventive amplifier configuration (using a pump wavelength of 1860 nm) achieves a high peak value of about 3.01 W, and the 3 dB or 50% output power operating bandwidth is from 1998-2108 nm (i.e., a very wide bandwidth of 110 nm). In comparison, plot B associated with the prior art shows a maximum output power at a lower level of about 2.57 W (a reduction of about 0.7 dB), clearly demonstrating the advantages of absorption-dominant pump wavelengths (such as the 1860 nm discussed above). The total power optical-to-optical power conversion efficiency from the 1860 nm pump to the 2050 nm band signal reaches a peak value of 60%, indicating a quite high level of power conversion efficiency in this 1860 nm pumped optical amplifier.

Figure 14:
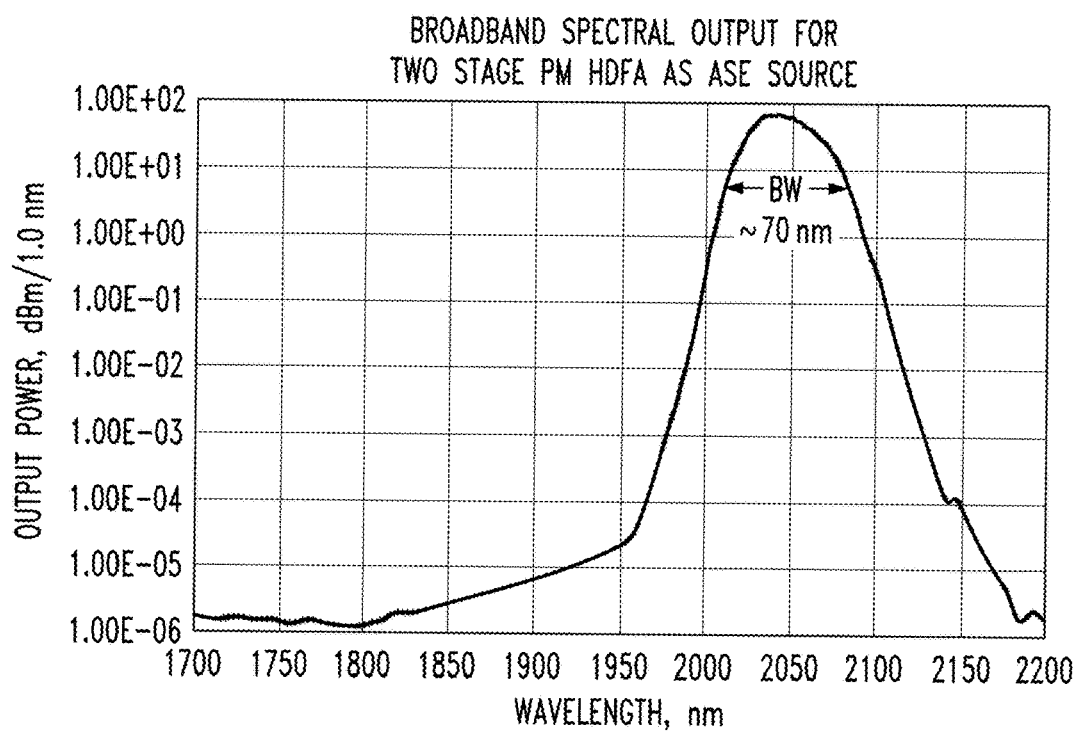
FIG. 14 is a plot showing the amplified spontaneous emission that is generated from the two-stage amplifier of FIG. 11 when the input optical signal is removed.

Two-stage Ho-doped fiber amplifier 50 as shown in FIG. 11 can also be operated as a high output power broadband ASE source by turning the input signal power down to zero. FIG. 14 plots the resulting broadband ASE output spectrum on a logarithmic scale. The total integrated output power for this broadband ASE spectrum is on the order of about 2.50 W, a relatively high value. The 10 dB spectral bandwidth is found to be 2015-2085 nm or 70 nm centered around a peak wavelength of 2045 nm, as shown in FIG. 14. This high output power and broad spectral width in the 2050 nm spectral band is quite valuable for applications such as fiber optic rotation sensors and optical component characterization.

Figure 15:
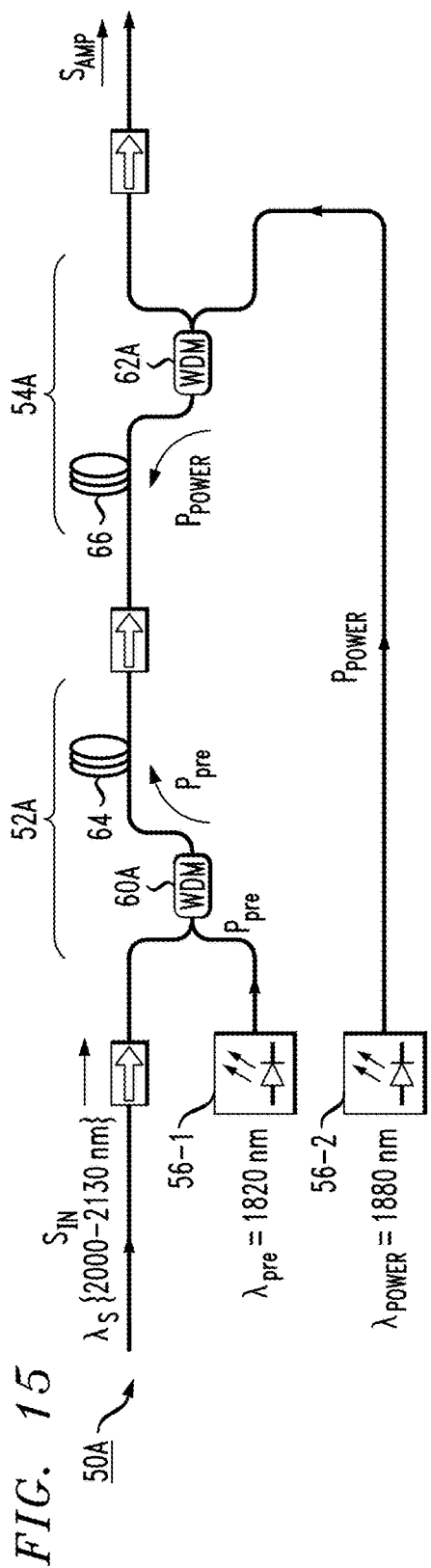
FIG. 15 is a block diagram of an alternative configuration for the embodiment of FIG. 11, in this case using different-valued absorption-dominant pump wavelengths for each amplifier stage.

FIG. 15 illustrates an alternative embodiment of a two-stage Ho-doped fiber amplifier, denoted in this case as doped fiber amplifier 50A. In this embodiment, each stage utilizes its own pump source. In particular, a preamplifier stage 52A is shown as utilizing a first pump source 56-1 that provides a co-propagating pump beam operating at an absorption-dominant pump wavelength (for example, $\lambda_{pre}$=1820 nm) with an output power of about 1.5 W. Power amplifier stage 54A is shown as including a second pump source 56-2, which provides a pump beam operating at a wavelength of about $\lambda_{power}$=1880 nm, with an output power of about 3.5 W. These particular pump wavelengths are chosen as an example, and other pump wavelengths in the absorption-dominant 1800 nm-1880 nm pump band may also be used.

Figure 16:
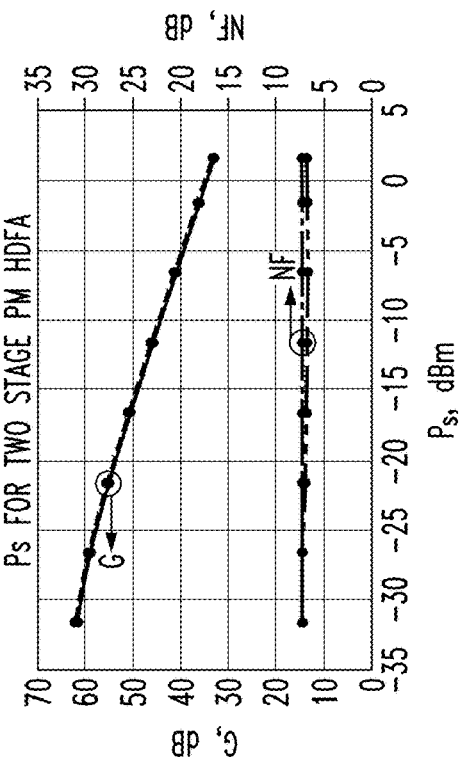
FIG. 16 contains gain and noise figure plots for the configuration of FIG. 15.

FIG. 16 contains plots of G and NF for two-stage Ho-doped fiber amplifier 50A of FIG. 15, as a function of input signal power for an input signal $S_{IN}$ operating at a wavelength of $\lambda_S$ of 2051 nm. The results are shown for the separate pump amplifier wavelength pairs described above in association the discussion of two-stage amplifier 50A of FIG. 15. Here, a maximum small signal gain of 62.3 dB is provided for pre/power pump wavelength combination of 1820 nm and 1880 nm. The noise figure is a low value of 6.7 dB which is also comparable to the previous amplifier.

Figure 17:
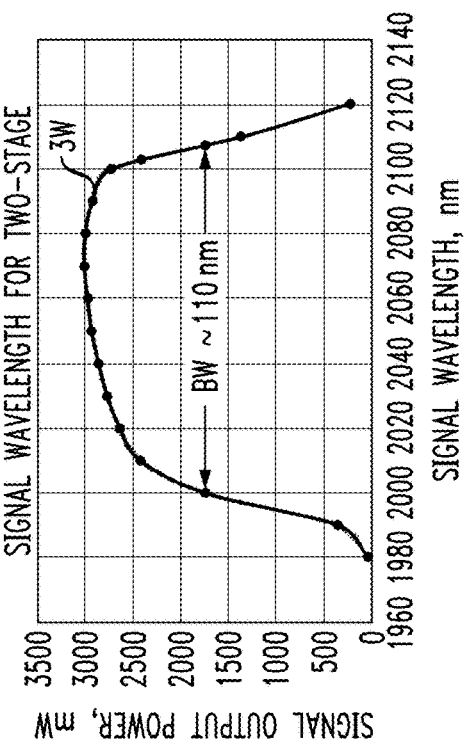
FIG. 17 is a plot of the simulated output power as a function of signal wavelength for the configuration of FIG. 15.

FIG. 17 shows the simulated output power as a function of signal wavelength for two-stage amplifier 50A of FIG. 15. A peak output power of 3.01 W is shown as associated with dual-wavelength, two-stage Ho-doped amplifier 50A, where this maximum power is associated with an input signal wavelength $\lambda_S$ of about 2070 nm. This maximum output power for the dual-wavelength two-stage amplifier 50A is essentially the same as the maximum value of 3.01 W for the split pump amplifier arrangement 50 of FIG. 11. Additionally, The 3 dB output power bandwidth for two-stage amplifier 50A also about the same value (110 nm) as that associated with amplifier arrangement 50.

Another multi-stage doped fiber amplifier formed in accordance with the present invention is shown in FIG. 18, which in this case illustrates a two-stage Ho-doped fiber amplifier 70 as comprising a preamplifier stage 72 based upon the use of a section of single-clad Ho-doped gain fiber 74, and a power amplifier stage 76 based upon the use of a section of double-clad Ho-doped gain fiber 86. In this case, a first pump source 80 is used in combination with preamplifier stage 72 and a second pump source 82 is used in combination with power amplifier stage 76.

Referring to the particulars of amplifier 70, an input signal $S_{IN}$ (which may be either a continuous wave (CW) or pulsed input), operating at a wavelength suitable for obtaining gain within a Ho-doped gain fiber (i.e., $\lambda_S$ in the range of about 2000 nm to 2150 nm) is passed through an input isolator and coupled into a signal port of a WDM 84. Pump beam P operating at an appropriate absorption-dominant wavelength (e.g., $\lambda_P$=1860 nm) is created by pump source 80 and coupled to the remaining input port of WDM 84. The combination of $S_{IN}$ and P is thereafter coupled into the Ho-doped core region of single-clad Ho-doped gain fiber 74. As mentioned above, the use of an absorption-dominant pump wavelength yields a larger spectral region over which an acceptable amount of gain is formed (in comparison to the standard pump wavelength of 1940 nm). For amplifier 70, the output from preamplifier stage 72 is shown as amplified signal $S_{A1}$. In most cases, an inter-stage isolator is disposed along the signal line between preamplifier stage 72 and power amplifier stage 76, with intermediate amplified signal $S_{A1}$ passing through this isolator before entering power amplifier stage 76.

The use of a double-clad gain fiber in power stage 76 of amplifier 70 allows for a significantly larger amount of pump beam to interact with the amplified signal $S_{A1}$ that is propagating through the core region of double-clad Ho-doped gain fiber 78. A simplified cut-away view of double-clad gain fiber 78 is shown in an inset of FIG. 18, illustrating a Ho-doped core region 3, surrounded by an inner cladding layer 4 and an outer cladding layer 5. The pump input(s) to double-clad gain fiber 78 is(are) typically introduced into inner cladding layer 4, and remain confined to propagate within both core region 3 and inner cladding layer 4. Indeed, the configuration of FIG. 18 shows the use of a multi-source pump configuration 82 with power amplifier stage 76. The additional interactions between the pump beams and signal light based on the use of a double-clad configuration lead to an increase in output power achieved by the amplifier stage. The utilization of multiple pump sources (here, shown as a first pump source 86-1 and a second pump source 86-2) provides an additional amount of pump power that may be converted into amplifier gain. An optical fiber tapered bundle 88, a structure well-known in the art, may be used to introduce multiple pump sources and the propagating, amplified signal $S_{A1}$ to double-clad Ho-doped gain fiber 78. The amplified output signal SAMP created by this configuration is shown as passing through an output isolator before exiting amplifier 70.

Figure 19:
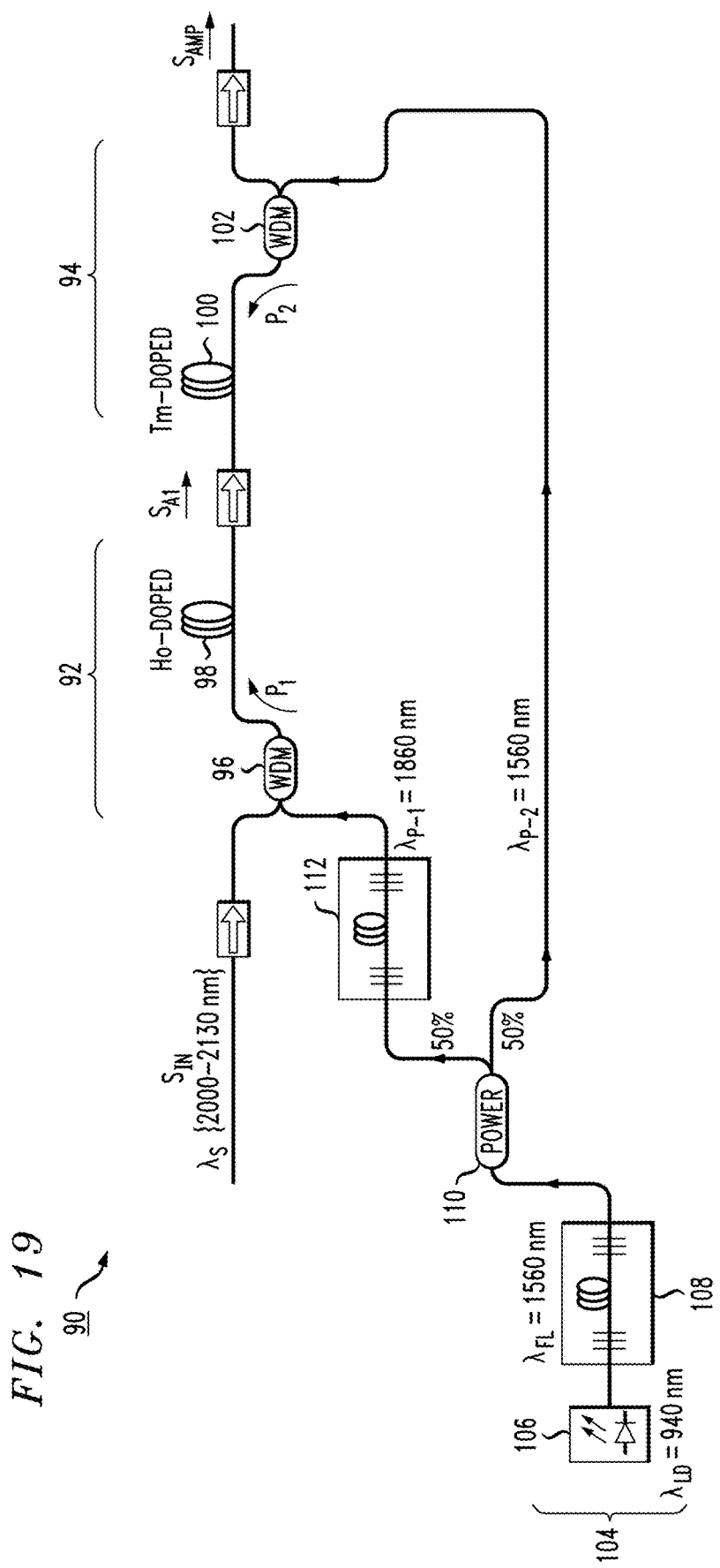
FIG. 19 illustrates an exemplary HDFA/TDFA two-stage amplifier formed in accordance with the principles of the present invention.

FIG. 19 illustrates yet another two-stage amplifier arrangement, in this case a hybrid HDFA/TDFA 90 that combines the high gain, large bandwidth, low noise figure and medium output power of a Ho-doped preamplifier stage 92 (similar to preamplifier stages 52, 52A discussed above) with the high saturated output power and large bandwidth of a Tm-doped power amplifier stage 94. Input signal light $S_{IN}$ operating at a signal wavelength $\lambda_S$ in the range of 2000-2100 nm passes through an input isolator and is thereafter applied as the signal input to a first WDM 96. A first pump beam $P_A$, discussed in detail below, is applied as the pump input to first WDM 96, with the combination of input signal $S_{IN}$ and first pump beam $P_A$ thereafter coupled into a section of single-clad, Ho-doped gain fiber 98 within Ho-doped preamplifier stage 92.

The amplified output signal $S_{A1}$ from Ho-doped preamplifier 92 passes through an inter-stage isolator and is then coupled into a section of Tm-doped gain fiber 100 within power amplifier stage 94 (in a preferred embodiment, a polarization-maintaining Tm-doped gain fiber is used). A second WDM 102, disposed at the output of Tm-doped gain fiber 100 is used to supply a counter-propagating pump beam to power amplifier stage 94. As discussed above, the presence of the counter-propagating pump beam creates additional amplification (in terms of gain and power) to propagating signal $S_{A1}$, providing amplifier output signal $S_{AMP}$ as the ultimate output from two-stage hybrid HDFA/TDFA 90.

In this embodiment, a single pump source 104 is used to create and supply pump beams operating at appropriate wavelengths for both Ho-doped preamplifier stage 92 and Tm-doped power amplifier stage 94. As shown, pump source 104 includes an input multi-watt semiconductor laser diode 106 operating at a wavelength $\lambda_{LD}$ of 940 nm. This input beam is then used to pump a multi-watt Er—Yb fiber laser 108, generating a pump output P at a wavelength $\lambda_{P-2}$ of 1560 nm. A power splitter 110 is used to divide pump output P in a 50/50 ratio, with a first 50% portion P-1 of the pump directed toward preamplifier stage 92 and a second 50% portion P-2 directed toward power amplifier stage 94.

Continuing with a description of preamplifier stage 92, first portion P-1 is shown as applied as an input to a second fiber laser 112, which is used to convert the incoming pump wavelength value of 1560 nm into an absorption-dominant pump wavelength appropriated for use within Ho-doped gain fiber 98. In this case, second fiber laser 112 comprises a multi-watt Tm-doped fiber laser configured to provide a pump beam $\lambda_{P-1}$=1860 nm to Ho-doped preamplifier stage 92.

As mentioned above, the second 50% portion P-2 of the 1560 nm output from pump source 104 is used as a counter-propagating pump beam for Tm-doped power amplifier stage 94. In particular, pump beam P-2 is applied as an input to second WDM 102, and thereafter directed into the output of Tm-doped gain fiber 100. In an exemplary embodiment, 2.5 W of pump light is available to pump Ho-doped gain fiber 98 of preamplifier stage 92, and 5 W of 1560 nm pump light is available to pump Tm-doped gain fiber 100 of power amplifier stage 94.

Figure 20:
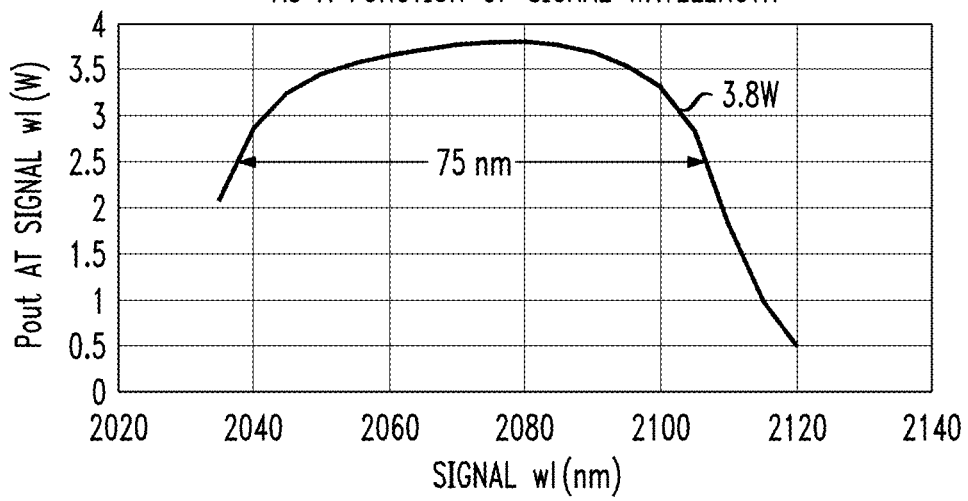
FIG. 20 is a plot of saturated output power for the hybrid HDFA/TDFA of FIG. 19.

FIG. 20 is a plot of saturated output power of hybrid HDFA/TDFA 90 of FIG. 19, shown as a function of input signal wavelength $\lambda_S$ over the range of 2030 nm to 2120 nm. A peak output power of 3.8 W is shown for $\lambda_S$=2080 nm, with a 3 dB output power bandwidth of about 75 nm, spanning the range from 2035-2110 nm.

Figure 21:
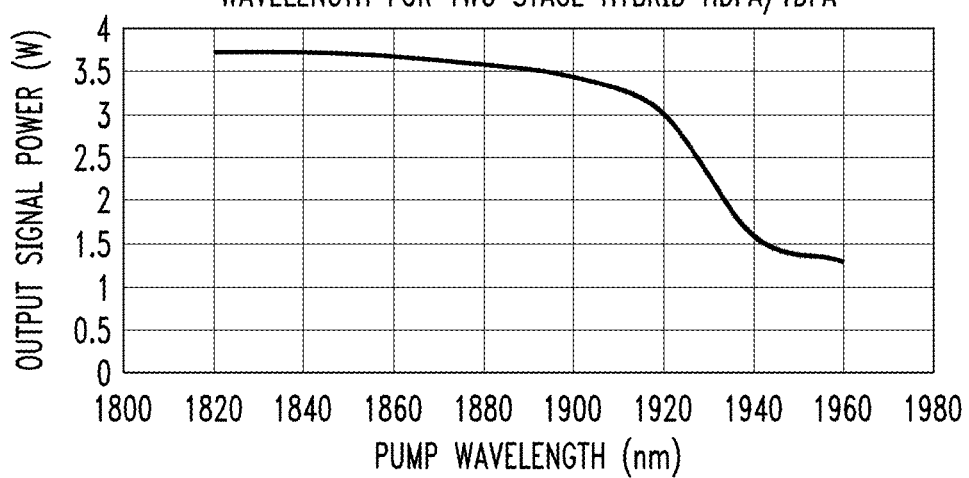
FIG. 21 illustrates the saturated output power for the same hybrid TDFA/HDFA, here as a function of absorption-dominant pump wavelength used by the HDFA preamplifier stage.

FIG. 21 illustrates the saturated output power for hybrid amplifier 90 as a function of pump wavelength $\lambda_{P-1}$ created by Tm-doped fiber laser 112 for Ho-doped preamplifier stage 92. Here, the strong effect of pump wavelength on the full amplifier performance is quite evident, with preamplifier pump wavelengths in the absorption-dominant wavelength range of 1820-1880 nm yielding optimum output power results. These results clearly illustrates the effectiveness of absorption-dominant in-band pump wavelengths for the Ho-doped preamplifier in the hybrid HDFA/TDFA design.

Figure 22:
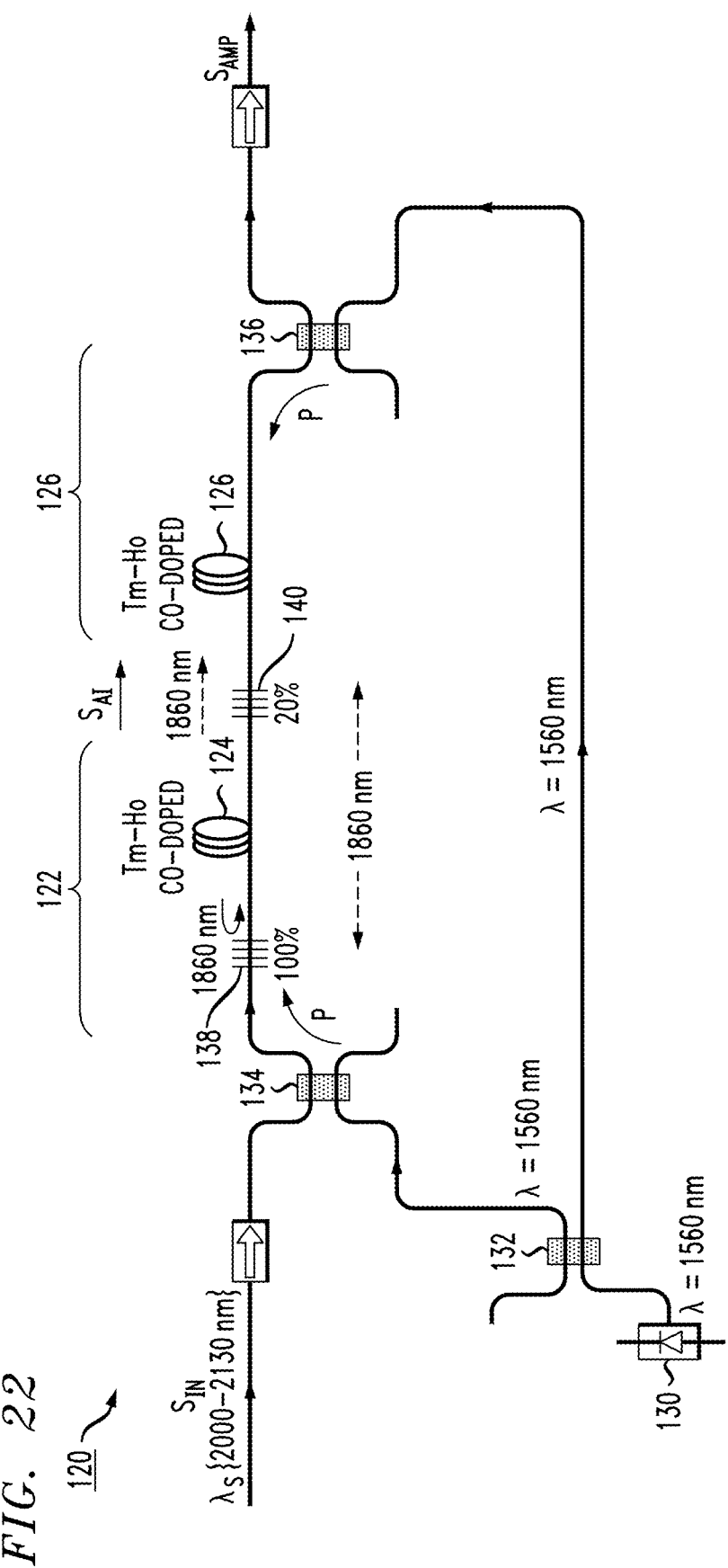
FIG. 22 depicts yet another multi-stage amplifier formed in accordance with the principles of the present invention, where Tm—Ho co-doped optical gain fiber is used in each amplifier stage.

Another embodiment of a two-stage doped fiber amplifier formed in accordance with the principles of the present invention in shown in FIG. 22. Denoted as two-stage doped fiber amplifier 120, each stage is based upon the use of co-doped Tm—Ho gain fiber in each amplifier stage. The configuration is shown as including a first amplifier stage 122 including a first section 124 of Tm—Ho co-doped gain fiber, and a second amplifier stage 126 including a second section 128 of Tm—Ho co-doped gain fiber. A pump source 130 is used to provide a pump beam at a first pump wavelength $\lambda_{P1}$ appropriate for generating gain in the presence of the Tm ions within gain fiber sections 124 and 128 (in one exemplary embodiment, $\lambda_{P1}$=1560 nm). A power splitter 132 is used to direct one half of the pump output toward first amplifier stage 122, and the second half of the pump output toward second amplifier stage 126.

A first WDM 134 is used to combine the incoming optical signal $S_{IN}$ and pump beam $P_1$, providing them as co-propagating inputs to first amplifier stage 122. A second WDM 136 is shown as positioned beyond the output of second amplifier stage 126, and is used in this case to direct the remaining portion of the pump beam operating at pump wavelength $\lambda_{P1}$=1560 nm into the Tm—Ho co-doped core region of second gain fiber section 128.

In accordance with this embodiment of the present invention, excitation of the Ho ions is provided by the use of a pair of FBGs disposed along the main signal path formed by the amplifier stages (similar to the arrangement of FIG. 10). FBGs 138, 140 are particularly configured to provide reflectivity of a second pump wavelength $\lambda_{P2}$ within the absorption-dominant range of wavelengths suitable for generating gain within an Ho-doped optical fiber. An important distinction between two-stage amplifier 120 and amplifier 30A of FIG. 10 is that in this example FBG 140 is formed to have only a 20% reflectivity, as opposed to the 100% reflectivity of second FBG 42 of doped fiber amplifier 30A. This means that, in addition to forming a fiber laser at $\lambda_{P2}$=1860 nm in first gain fiber section 122 (so as to pump the Ho ions in that fiber), the fiber laser formed between the boundaries of FBG 138 and FBG 140 also pumps second gain fiber section 128 of second amplifier stage 126. Two-stage amplifier 120 as shown in FIG. 22 thus enables optimization of amplifier performance by separately adjusting the fiber lengths and material compositions of the two gain fibers 124 and 128.

In summary, the principles and embodiments of the present invention clearly demonstrate that the utilization of an absorption-dominant pump wavelength (e.g., in the range of 1800-1900 nm) yields a dramatic and technically significant performance advantage in gain and output power for both Ho-doped fiber amplifiers and ASE sources, relative to the performance obtained with utilizing a conventional pump wavelength (e.g., 1940 nm). These results are consistent over the full array of single stage and multi-stage Ho-doped optical amplifiers, validating the analysis of the gain and absorption curves in FIGS. 2 and 3. These results are considered to provide significant technical and commercial advances in the state of the art for in-band pumped Ho-doped fiber optical amplifiers.

While certain preferred embodiments of the present invention have been illustrated and described in detail, it should be apparent that modifications and adaptations to these embodiments may occur to one skilled in the art without departing from the scope of the present invention as set forth in the claims appended hereto. Indeed, the described embodiments are to be considered in all respects as only illustrative and not restrictive.

What is claimed is:

1. An optical amplifier for operation at an eye-safe input signal wavelength $\lambda_S$ within the 2 µm region, comprising:
    a section of Holmium (Ho)-doped optical gain fiber responsive to an input optical signal for generating gain within the input optical signal as it propagates therealong by the presence of Ho ions, providing as an output an amplified optical signal, the section of Ho-doped optical gain fiber exhibiting a gain coefficient G and an absorption coefficient α that both vary as a function of an applied pump wavelength; and
    a pump source coupled to the section of Ho-doped optical gain fiber and configured to provide pump light at a wavelength $\lambda_P$ within an absorption-dominant pump wavelength range of 1820 nm to 1880 nm, where $\alpha(\lambda_P) > G(\lambda_P)$ regardless of the value of input signal wavelength $\lambda_S$ within the 2 µm region.

2. An optical fiber amplifier as defined in claim 1 wherein the section of Ho-doped optical gain fiber comprises a section of single-clad Ho-doped optical gain fiber.

3. An optical fiber amplifier as defined in claim 1 wherein the section of Ho-doped optical gain fiber comprises a section of double-clad Ho-doped optical gain fiber.

4. An optical fiber amplifier as defined in claim 1 wherein the parameters of the Ho-doped optical gain fiber are configured to support a continuous wave (CW) input optical signal.

5. An optical fiber amplifier as defined in claim 1 wherein the parameters of the Ho-doped optical gain fiber are configured to support a pulsed input optical signal.

6. An optical fiber amplifier as defined in claim 1 wherein the section of Ho-doped optical gain fiber comprises a section of polarization-maintaining Ho-doped optical gain fiber.

7. The optical fiber amplifier as defined in claim 1 wherein the optical fiber amplifier further comprises a wavelength division multiplexer (WDM) disposed at the input to the section Ho-doped optical gain fiber, with the input optical signal and the pump light applied as separate inputs to the WDM and combined therein onto a single output path from the WDM, where the output from the WDM is coupled to the Ho-doped optical gain fiber.

8. The optical fiber amplifier as defined in claim 1 wherein the pump light is coupled into the output endface of the Ho-doped optical gain fiber, forming a counter-propagating optical amplifier with respect to the direction of propagation of the input optical signal.

9. The optical fiber amplifier as defined in claim 8 wherein a wavelength division multiplexer (WDM) is disposed at the output of the section of Ho-doped optical gain fiber and the pump light is applied as an input to the WDM and directed as a first output from the WDM into the output endface of the Ho-doped optical gain fiber.

10. The optical fiber amplifier as defined in claim 8 wherein an optical circulator is coupled at a first port to the output of the section of Ho-doped optical gain fiber and the pump light is applied as an input to a second port of the optical circulator and directed to exit the optical circulator at the first port, thereby coupled into the section of Ho-doped optical gain fiber so as to propagate therealong in a direction counter to the applied input optical signal.

11. The optical fiber amplifier as defined in claim 1 wherein the section of Ho-doped optical gain fiber further comprises Thulium (Tm) dopant, creating a co-doped Tm—Ho optical gain fiber, the pump source further providing pump light at a second absorption-dominant pump wavelength $\lambda_{P2}$ within the wavelength range of 1820 nm to 1880 nm and selected utilized to generate gain in the presence of Tm ions.

12. A multi-stage optical amplifier for operation at an eye-safe input signal wavelength $\lambda_S$ within the 2 µm region, comprising:
    a plurality of N sections of Ho-doped optical fiber disposed in a concatenated configuration such that an input optical signal applied to a first amplifier stage propagates through the plurality of N sections of Ho-doped optical fiber and exits as an amplification optical output signal, each section of Ho-doped optical fiber characterized by a gain coefficient $G(\lambda)$ and an absorption coefficient $\alpha(\lambda)$ that vary as a function of a wavelength of the pump light applied thereto; and
    a pump source providing pump light at a defined absorption-dominant pump wavelength $\lambda_P$ selected from a wavelength range of 1820 nm 20 1880 nm, where $\alpha(\lambda_P) > G(\lambda_P)$ regardless of the value of input signal wavelength $\lambda_S$ within the 2 µm region, the pump light applied as an input to each amplifier stage of the multi-stage optical fiber amplifier.

13. The multi-stage optical amplifier as defined in claim 12 wherein the amplifier comprises
    a preamplifier stage including a section of single-clad Ho-doped optical fiber; and
    a power amplifier stage including a section of double-clad Ho-doped optical fiber, with a plurality of separate beams of pump light applied as an input to the section of double-clad Ho-doped optical fiber.

14. The multi-stage optical amplifier as defined in claim 12 wherein the plurality of N sections of Ho-doped optical fiber further comprise Tm dopant, forming a plurality of N sections of Tm—Ho co-doped optical fiber, the pump source further providing pump light at a second absorption-dominant wavelength $\lambda_2$ associated with generating gain in the presence of Tm ions.

15. The multi-stage optical amplifier as defined in claim 12 wherein the pump source comprises a plurality of N pump elements, each element associated with an amplifier stage in a one-to-one relationship.

16. The multi-stage optical amplifier as defined in claim 12 wherein the amplifier further comprises a 1:N power splitter coupled between an output of the pump source and a pump light input of each stage of the multi-stage amplifier so as to provide a separate pump beam for propagating through each section of Ho-doped optical gain fiber of the plurality of N sections of Ho-doped optical gain fiber.

17. A hybrid optical amplifier for operation within an eye-safe wavelength region comprising:

a preamplifier stage including:

a section of single-clad Ho-doped optical fiber, the preamplifier providing gain to an input signal propagating at a wavelength $\lambda_S$ within the eye-safe wavelength region; and a preamplifier pump source providing a pump beam operating at an absorption-dominant pump wavelength $\lambda_{pre}$ where the absorption coefficient of the section of single-clad Ho-doped optical fiber is greater than the gain coefficient of the section of single-clad Ho-doped optical gain fiber, the presence of the pump beam in the section of single-clad Ho-doped optical fiber providing gain to the input signal, generating as an output an intermediate amplified output signal; and a power amplifier stage disposed at the output of the preamplifier stage and including:

a section of double-clad Tm-doped optical fiber responsive to the intermediate amplified output signal from the preamplifier stage; and a power amplifier pump source providing a pump beam operating at a waveguide appropriate for generating gain in the presence of Tm ions, the output from power amplifier comprising an amplified version of the incoming optical signal.

\* \* \* \* \*